(No Model.)

E. G. CLYMANS.
THRESHING MACHINE.

No. 576,755. Patented Feb. 9, 1897.

Witnesses
George H. Bliss
George H. Bliss Jr.

Inventor
Ezra G. Clymans.
By Attorney Herbert W. Jenner.

UNITED STATES PATENT OFFICE.

EZRA G. CLYMANS, OF WAYNESBOROUGH, PENNSYLVANIA, ASSIGNOR TO THE GEISER MANUFACTURING COMPANY, OF SAME PLACE.

THRESHING-MACHINE.

SPECIFICATION forming part of Letters Patent No. 576,755, dated February 9, 1897.

Application filed February 17, 1896. Serial No. 579,546. (No model.)

*To all whom it may concern:*

Be it known that I, EZRA G. CLYMANS, a citizen of the United States, residing at Waynesborough, in the county of Franklin and State of Pennsylvania, have invented certain new and useful Improvements in Threshing-Machines; and I do hereby declare the following to be a full, clear, and exact description of the invention, such as will enable others skilled in the art to which it appertains to make and use the same.

This invention relates to threshing-machines; and it consists in the novel construction and combination of the parts hereinafter fully described and claimed.

Figure 1:
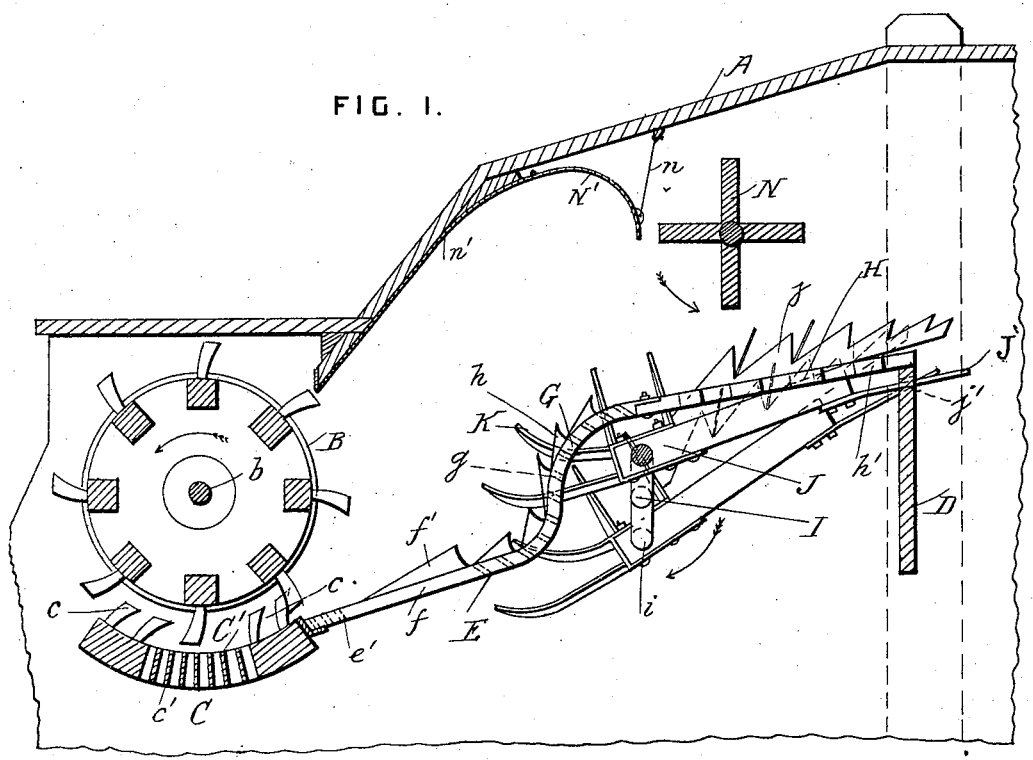
Figure 2:
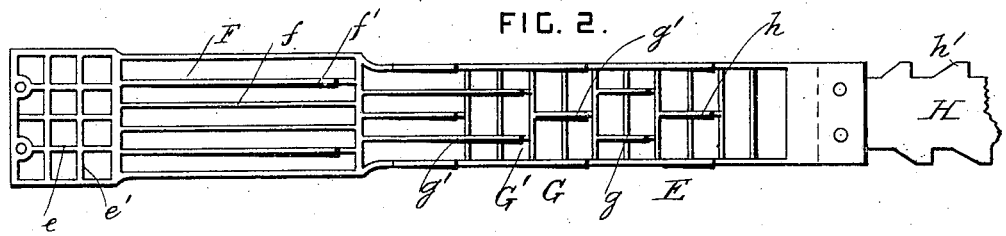
Figure 3:
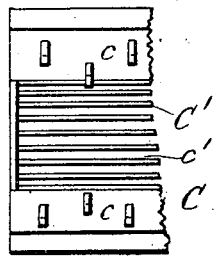

In the drawings, Figure 1 is a longitudinal section of the front portion of a threshing-machine constructed according to this invention. Fig. 2 is a plan view of one of the grate-bars. Fig. 3 is a plan view of a portion of the concave.

A is the casing of the threshing-machine, and B is its cylinder, provided with teeth in the usual manner.

C is the concave under the cylinder. This concave is made in two parts, each provided with two rows of teeth $c$, and C' is a grating provided with rectangular holes $c'$ and arranged intermediate of the two parts of the concave. The width of the grating C' is about equal to the two parts of the concave put together and the said grating is arranged vertically under the driving-shaft $b$ of the cylinder.

D is a guard-board supported transversely of the casing of the machine at some little distance to the rear of the cylinder. This guard-board operates to prevent grains from flying through the machine.

E are grate-bars supported at short distances apart between the concave and the guard-board. These grate-bars are all substantially alike. Each grate-bar E is provided at its extreme front end with longitudinal ribs $e$ and cross-ribs $e'$. The straight portion of the bar behind the ribs $e'$ consists of longitudinal ribs $f$, two of which are provided on their upper edges with wedge-shaped projections $f'$, having their apices nearest the cylinder.

F are longitudinal passages between the ribs $f$. The middle portion G of each grate-bar has a double curve and is provided with deflecting-ribs $g$ and longitudinal ribs $g'$, arranged out of line with each other. The cross-ribs $g$ are inclined downwardly and rearwardly at such an angle or at such angles that the grain flying from the cylinder and striking them will be deflected through the passages or apertures G' between them. The deflecting-ribs may be wholly dispensed with, as their presence is not essential in carrying out the present invention.

The ribs $g'$ are provided with wedge-shaped projections $h$ on their upper edges, similar to the projections $f'$.

The rear portion H of each grate-bar is straight and is provided with ratchet-shaped teeth $h'$ upon its sides. The rear portion is preferably formed of wood and is bolted to the middle portion.

I is a crank-shaft provided with cranks $i$ and journaled in the casing under the middle portions of the grate-bars. Two cranks $i$ are shown, arranged at opposite sides of the crank-shaft, but any number of cranks may be provided and the number may be varied according to the width of the machine.

J are straw-rakes provided with upwardly and rearwardly projecting teeth $j$, which work vertically between the opposed teeth $h'$ of the grate-bars.

J' are guide-bars secured to the straw-rakes and arranged to slide freely in the guide-holes $j'$ in the upper part of the guard-board.

K are forks or prongs secured to the front portions of the straw-rakes. There are preferably four prongs to each straw-rake, and the front ends of the straw-rakes are carried by the cranks $i$. The prongs and teeth work in the spaces between the grate-bars.

N is a cross-shaped beater arranged behind the cylinder in the upper part of the casing. Motion is imparted to the cylinder, the beater, and the crank-shaft in the direction of the arrows in the drawings. Any approved driving mechanism may be employed for this purpose.

N' is a curved deflector having its front edge hinged to the casing in front of the beater. The rear portion of the deflector is carried by a flexible support $n$, which permits it to rise vertically. The front edge of the deflector is higher than its lower edge, so that the deflector inclines downwardly and rearwardly and has its rear edge supported close to the arms of the beater when passing the horizontal plane of the beater-shaft. A plate $n'$ is arranged upon the top of the casing in front of the deflector to prevent it from being abraded.

The unthreshed grain is fed between the cylinder and concave in the usual manner. Most of the grains are threshed out at the first part of the concave and fall through the holes of the grating $C'$. The remaining grains are threshed out by the other part of the concave and fly off rearwardly.

The wedge-shaped projections $f'$ raise the straw and the grains fly through the longitudinal passages F. Those grains which fly in an upward direction and strike against the deflecting-ribs $g$ pass downwardly through the spaces between them. No deflecting-ribs are provided between the ribs $f$, because at this point the grains are driven off at such a high velocity as would cause them to rebound with great violence from any deflecting-ribs placed in their path. When the deflecting-ribs are not used, the grains fly through the grate-bars and are stopped by the guard-board D. The grate arrests the straw, and the prongs, which are suddenly thrust into the straw with a substantially horizontal motion, raise it with a jerking motion and loosen it up. At the same time the straw-rakes propel rearwardly the straw which has been previously raised to the top of the grate by the prongs. The projections $h$ prevent the straw from packing against the curved portions of the grate-bars.

The curved deflector causes any grains which strike it to fall through the grate-bars. It also deflects the straw, so that the beater can engage with it. When a large quantity of straw is pressed upwardly against the deflector, the deflector rises, and the straw is then forced downward by the beater. The beater presses the straw into contact with the straw-rakes and the straw-rakes work the straw about, shake the loose grains out of it, and conduct it to the rear part of the machine.

What I claim is—

1. In a threshing-machine, the combination, with a series of grate-bars, of a crank-shaft provided with cranks and journaled under the grate-bars, a guard-board behind the said crank-shaft, straw-rakes each having its front portion provided with a row of prongs projecting upwardly and forwardly at different angles and having its rear portion provided with a row of upwardly and rearwardly projecting teeth, the front ends of the said rakes being carried by the said cranks, and guide-bars projecting from the said straw-rakes and slidable on the said guard-board above the level of the crank-shaft, substantially as set forth.

2. In a threshing-machine, the combination, with a series of grate-bars having double curved portions, and ratchet-shaped teeth on the sides of their rear portions; of a crank-shaft provided with cranks and journaled under the grate-bars, a guard-board behind the said crank-shaft, straw-rakes each having its front portion provided with a row of prongs projecting upwardly and forwardly at different angles and having its rear portion provided with a row of upwardly and rearwardly projecting teeth, the front ends of the said rakes being carried by the said cranks, and guide-bars projecting from the said straw-rakes and slidable on the said guard-board above the level of the crank-shaft, substantially as set forth.

In testimony whereof I affix my signature in presence of two witnesses.

EZRA G. CLYMANS.

Witnesses:
GETRIN ANDERSON,
DANIEL S. BEARD.